(12) United States Patent
Birch et al.

(10) Patent No.: US 8,386,418 B2
(45) Date of Patent: Feb. 26, 2013

(54) SYSTEM AND METHOD FOR AN INTELLIGENT STORAGE SERVICE CATALOG

(75) Inventors: John G. Birch, Nokesville, VA (US); Laura A. Richardson, Ridge Manor, FL (US)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 12/627,755

(22) Filed: Nov. 30, 2009

(65) Prior Publication Data

US 2011/0131174 A1    Jun. 2, 2011

(51) Int. Cl.
G06F 17/30    (2006.01)
G06F 7/00    (2006.01)

(52) U.S. Cl. ....................... 707/602; 707/802

(58) Field of Classification Search .................. 707/602, 707/802
See application file for complete search history.

(56) References Cited

U.S. PATENT DOCUMENTS

| | | | |
|---|---|---|---|
| 5,729,746 A | 3/1998 | Leonard | |
| 6,032,160 A | 2/2000 | Lehman | |
| 6,401,182 B1 | 6/2002 | Sweeney | |
| 6,430,611 B1 | 8/2002 | Kita et al. | |
| 6,571,310 B1 | 5/2003 | Ottesen et al. | |
| 6,820,035 B1 * | 11/2004 | Zahavi | 702/182 |
| 7,024,517 B1 | 4/2006 | Zahavi | |
| 7,069,267 B2 | 6/2006 | Spencer, Jr. | |
| 7,219,192 B2 * | 5/2007 | Yasukawa et al. | 711/114 |
| 7,243,094 B2 * | 7/2007 | Tabellion et al. | 1/1 |
| 7,373,635 B2 | 5/2008 | Guyette | |
| 2006/0253621 A1 | 11/2006 | Brewer et al. | |
| 2007/0089085 A1 | 4/2007 | Atkin et al. | |
| 2008/0163157 A1 | 7/2008 | Atkin et al. | |
| 2008/0163158 A1 | 7/2008 | Guyette | |

* cited by examiner

*Primary Examiner* — Kuen Lu
(74) *Attorney, Agent, or Firm* — William Schiesser; Roberts Mlotkowski Safran & Cole, P.C.

(57) ABSTRACT

A method and system relate to data storage, and more particularly, to an intelligent storage service catalog. A method is implemented in a computer infrastructure having programming instructions. The programming instructions are operable to receive at least one definition of storage requirements for an organization for at least one data type and establish at least one data storage allocation rule based on the at least one data type. Additionally, the programming instructions are operable to receive a request for storage for the at least one data type and allocate data storage based on the request for storage and the at least one data storage allocation rule.

23 Claims, 9 Drawing Sheets

FIG. 2

Storage Service Catalog
Business Requirements Division — 200

Data Type — 205
☐ Operating System ☐ Application/Binary Files ☐ Application Logs/Dynamic Files ☐ Static Files ☐ Development Code
☐ OLTP Database ☐ Data Warehouse ☐ Database Transaction Logs ☐ Email ☐ Email Logs ☐ Backup ☐ Archive
☐ File Server ☐ Video ☐ Voice ☐ Compliance

110

| Category | Details |
|---|---|
| Availability | Availability ☐ 99.999% (5.3 mins/yr) ☐ 99.99% (53 mins/yr) ☐ 99.95% (4 hrs/yr) ☐ 99.9% (8.8 hrs/yr) ☐ 99.5% (44 hrs/yr) ☐ 99% (88 hrs/yr) ☐ 98% (7 days/yr) ☐ Other |
| Size | Disk Space Required _____ GB  Growth Rate – Past Year ☐ 0 – 10 % ☐ 11 – 25 % ☐ 26 – 50 % ☐ 51 – 100 %  Growth Rate – Current Year ☐ 0 – 10 % ☐ 11 – 25 % ☐ 26 – 50 % ☐ 51 – 100 % |
| Performance | Performance – IOPS ☐ > 50k IOPS Extreme ☐ > 35k IOPS High ☐ > 20k IOPS Medium to High ☐ > 5k IOPS Medium ☐ 1k IOPS Low  Performance – Response Time ☐ < 8 ms ☐ 8 – 14 ms ☐ 12 – 30 ms ☐ > 30 ms |
| Operational Recovery | Recovery Time Objective (RTO): ☐ ≤ 5 minutes ☐ 15 minutes ☐ 30 minutes ☐ ≤ 4 hours ☐ 24 hours ☐ < 72 hours ☐ Best Effort ☐ Other  Recovery Point Objective (RPO): ☐ Last Transaction ☐ 30 minutes ☐ 1 hour ☐ ≤ 12 hours ☐ 12 hours ☐ Previous Close of Business ☐ Best Effort ☐ Other  Retention Period ☐ 14 days ☐ 30 days ☐ 90 days ☐ Other  Versions Retained ☐ 14 ☐ 30 ☐ Indefinite |
| Disaster Recovery | Recovery Time Objective (RTO): ☐ ≤ 5 minutes ☐ 15 minutes ☐ 30 minutes ☐ ≤ 4 hours ☐ 24 hours ☐ < 72 hours ☐ Best Effort ☐ Other  Recovery Point Objective (RPO): ☐ Last Transaction ☐ 30 minutes ☐ 1 hour ☐ ≤ 12 hours ☐ 12 hours ☐ Previous Close of Business ☐ Best Effort ☐ Other  Retention Period ☐ 14 days ☐ 30 days ☐ 90 days ☐ Other  Versions Retained ☐ 14 ☐ 30 ☐ Indefinite |
| Data Security | Encryption – Data at rest ☐ Hardware Key ☐ Central key manager  Encryption – Data movement ☐ IPSEC ☐ SSL ☐ None  Disposition – Data Shredding ☐ Hardware destroy ☐ DoD shred ☐ Standard delete |
| Compliance | Data Integrity ☐ Guarantee of Immutability ☐ None  Retention Period ☐ 1 year ☐ 3 years ☐ 7 years ☐ 10 years ☐ Forever |
| LM | Data Usage Cycle: ☐ Monthly ☐ Quarterly ☐ Semi-Annual ☐ Annual |

210 — 215 — 220

*Intelligent*
Storage Service Request — 400

Requestor:     Date:
Business Unit:     Project Manager:
Project Name     Application:

AnyUser

Please choose the appropriate options | | | Standard GB Requirement

- For what type of data is space required?
- Is this for growth or new space?
- What is the criticality of this data?
- What form of Information Right Management is required?

— 410

— 405

| OLTP Database |
| New |
| Production |
| None |
| PII - Private |
| *PCI - CC* |
| Confidential |
| None |

OLTP Database     100

Other Data Types that may also require more space are: — 415
  Database Transaction Logs
  DB Archive / Archive Logs Totals     Tier 2     100

Storage Services — 605

| | |
|---|---|
| Remote Storage Replication | Periodic |
| Point in Time Disk Copy | Available |
| Proactive Performance Monitoring and Management | Yes |
| 7/24/365 SAN and Storage Monitoring | Yes |
| Monthly Growth Forecasts | SRM tool general host agents to provide summary level information |
| Storage Network | Utilization of asynchronous remote replication |
| | Utilization of multiple point in time copies of data |
| IP Network | Available IP/DNS global failover hardware |
| ILM-Policies for this Tier | Backed up to |
| ILM-Next Tier Target | Tier 4 |
| ILM-Duration | 14 days |

Storage Technologies — 610

| | |
|---|---|
| Availability | |
| Single Points of Failure | No |
| SAN Switch Subscription Ratio | 10 to 1 |
| Performance Level Range | Medium |
| Storage System | Enterprise class storage system from EMC(CX), HP (EVA), IBM (DS4K), or HDS (AMS or WMS) |
| Drives / RAID Configuration | Standard RPM Fibre Channel Storage volumes in a RAID-5 configuration |
| Storage Network | Director class SAN switches configured in A redundant core-edge configuration |
| IP Network | Redundant IP network core switches |
| Application Protection Software | Local Application Clustering Software |
| Application Protection Software | IP NIC teaming |
| Application Protection Software | SAN HBA multi-pathing |

FIG. 6

SYSTEM AND METHOD FOR AN INTELLIGENT STORAGE SERVICE CATALOG

FIELD OF THE INVENTION

The present invention generally relates to data storage, and more particularly, to a method and system for an intelligent storage service catalog.

BACKGROUND

Data proliferation refers to the unprecedented amount of data, for example, structured and unstructured data, that, e.g., business and government continue to generate at an unprecedented rate. Additionally, data proliferation refers to the usability problems that result from attempting to store and manage that data. While originally pertaining to problems associated with paper documentation, data proliferation has become a major problem in primary and secondary data storage on computers.

While digital storage has become cheaper, the associated costs, from, for example, raw power to maintenance and from metadata to search engines, have not kept up with the proliferation of data. Although the power required to maintain a unit of data has fallen, the cost of facilities that house the digital storage has tended to rise.

Data proliferation may be problematic for several reasons. For example, data proliferation may cause difficulty when trying to find and retrieve information. An organization's employees can spend more than one hour per week to find, for example, hard-copy documents, which increases costs to manage and store such documents. In networks of primary and secondary data storage, problems finding electronic data are analogous to problems finding hard copy data. Additionally, for example, data proliferation may cause data loss and legal liability when data is disorganized, not properly replicated and/or cannot be found in a timely manner. Moreover, data proliferation may increase manpower requirements to manage, for example, increasingly chaotic data storage resources. Furthermore, data proliferation may cause slower networks and application performance due to excess traffic as users search and search again for the material they need. Data proliferation may also cause high cost in terms of the energy resources required to operate storage hardware.

Data centers, e.g., shared data centers, may be used for data storage, amongst other purposes. For example, an organization may obtain data storage from, e.g., a data storage service provider. In obtaining such data storage, an organization must determine an amount of storage necessary to meet their data storage requirements. However, such a determination of necessary storage information may be difficult and/or expensive to perform. As a result, an organization may obtain more storage than necessary for their actual storage requirements, which increases expenditures and reduces efficiencies.

Moreover, a more efficient approach to data storage management is needed. That is, for example, with the demands of line of business (LOB) owners for faster provisioning, application owners designing their own solutions, the desire for information technology (IT) to be more energy efficient, storage growth that continues despite efforts to optimize storage, the desire for visibility to storage cost and usage ownership, a desire to control IT costs and/or business requesting storage multi-years in advance, e.g., due to slow cycle of past procurement, the current approaches to data storage provisioning and management are insufficient.

Accordingly, there exists a need in the art to overcome the deficiencies and limitations described herein above.

SUMMARY

In a first aspect of the invention, a method is implemented in a computer infrastructure having computer executable code tangibly embodied on a computer readable storage medium having programming instructions. The programming instructions are operable to receive at least one definition of business requirements for an organization for at least one data type and define an intelligent storage service catalog (ISSC) that details the underlying technologies and service tiers defined for the business. Furthermore, the programming instructions are operable to establish at least one data storage allocation rule based on the at least one data type. Additionally, the programming instructions are operable to receive a request for storage for the at least one data type and allocate data storage based on the request for storage and the at least one data storage allocation rule.

In another aspect of the invention, a system comprises a business requirements definition (BRD) tool operable to receive at least one definition of business requirements for an organization for at least one data type and an intelligent storage service catalog (ISSC) data type matrix tool operable to establish at least one data storage allocation rule based on the at least one definition of the business requirements. Additionally, the system comprises an intelligent storage service catalog (ISSC) tool that details underlying technologies and services that at least meet the business requirements of the at least one data type and an intelligent storage service request (ISSR) tool operable to receive a request for storage for the at least one data type. Furthermore, the system comprises a storage allocation tool operable to allocate data storage based on the request for storage and the at least one data storage allocation rule.

In an additional aspect of the invention, a computer program product comprising a computer usable storage medium having readable program code embodied in the medium is provided. The computer program product includes at least one component operable to receive at least one definition of business requirements for an organization for at least one data type and establish at least one data storage allocation rule based on the at least one data type. Additionally, the at least one component operable to receive a request for storage for the at least one data type and allocate data storage based on the request for storage and the at least one data storage allocation rule. The at least one data type comprises at least one of: operating system, application/binary files, application logs/dynamic files, static files, development code, online transaction processing (OLTP) database, data warehouse, database logs, email, email logs, backup, archive, file server, video, voice and compliance. The at least one definition of business requirements for the organization for the at least one data type comprises business requirements for at least one of: availability, size, performance, operational recovery, disaster recovery, data security, compliance and life cycle management.

In a further aspect of the invention, a computer system for allocating data storage, the system comprising a CPU, a computer readable memory and a computer readable storage media. Additionally, the system comprises first program instructions to receive at least one definition of business requirements for an organization for at least one data type and second program instructions to establish at least one data storage allocation rule based on the at least one data type and the at least one definition of business requirements. Furthermore, the system comprises third program instructions to receive a request for storage for the at least one data type and fourth program instructions to allocate data storage based on the request for storage and the at least one data storage allocation rule. The first, second, third and fourth program instructions are stored on the computer readable storage media for execution by the CPU via the computer readable memory.

In an additional aspect of the invention, a method comprises providing a computer infrastructure operable to receive at least one definition of business requirements for an organization for at least one data type. Furthermore, the computer infrastructure operable to establish at least one data storage allocation rule based on the at least one data type and receive a request for storage for the at least one data type. Additionally, the computer infrastructure operable to allocate data storage based on the request for storage and the at least one data storage allocation rule.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

FIG. 2 illustrates an exemplary and non-exhaustive business requirements definition (BRD) tool for defining business requirements by data type in accordance with aspects of the invention;

FIG. 4 shows an exemplary intelligent storage service request (ISSR) in accordance with aspects of the invention;

FIG. 6 illustrates exemplary storage services information and storage technologies information in accordance with aspects of the invention;

DETAILED DESCRIPTION

Figure 1:
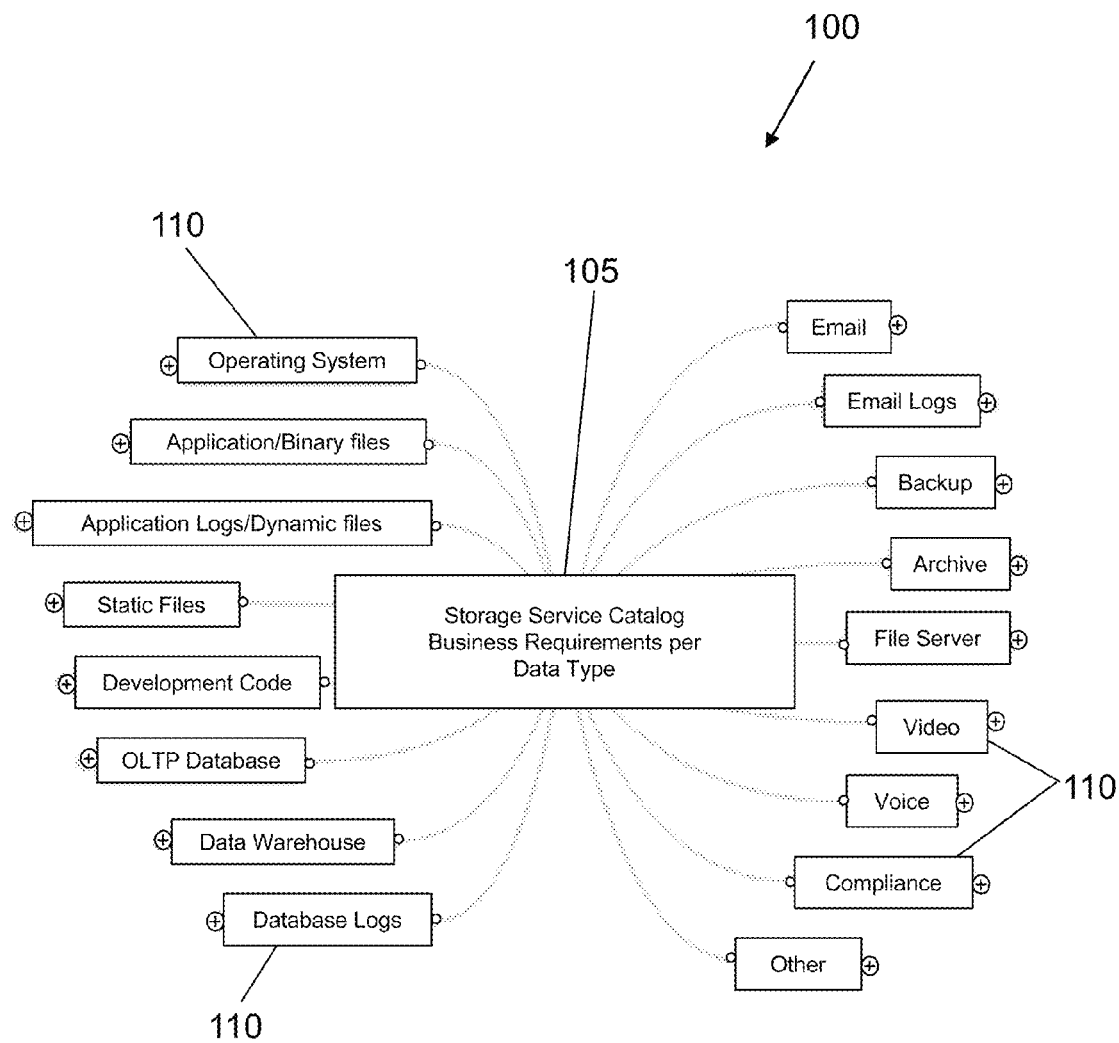
FIG. 1 illustrates an exemplary and non-exhaustive data type list in accordance with aspects of the invention.

The present invention generally relates to data storage, and more particularly, to a method and system for improving storage utilization by standardizing the way storage is requested, e.g., using an intelligent storage service catalog (ISSC) and/or an intelligent storage service request (ISSR). In accordance with aspects of the invention, improving storage usage begins with standardizing how that storage is requested.

The present invention uses a data type, rather than an application for determining, e.g., an organization's storage allocation requirements. That is, while in the industry, storage allocation is largely done by application (which may include a number of different data types), the present invention has recognized that organizing data business requirements by data types provides for more efficient use of storage. Additionally, in the industry, tiering is also conducted at the application level. However, this is not the most efficient place (i.e., at the application level) to consider proper tiering. For example, when an application is prepared for replication or for disaster recovery, the application is broken down into parts. Database logs are handled separately from the actual data to ensure the database will be recoverable at the remote location. However, in accordance with the present invention, the ISSC uses data types, which enables proper tiering wherein decisions are made by the type or function of the data rather than that of the overall application. Thus, the present invention more efficiently establishes the way disk space is requested and at the same time optimizes the data for backup, replication, information lifecycle management (ILM), archiving, purging, etc.

Thus, the present invention is operable to eliminate storage waste by creating business-based (e.g., storage) requirements and/or standards for all data types and, in embodiments, assuring that a high amount, for example, eighty percent, of storage requests adhere to such business-based requirements and/or standards. By utilizing storage requests in accordance with the created business-based requirements and/or standards of the present invention, for example, "one-off" designs and/or requests that unnecessarily extend inefficient storage allocations and/or waste out into years, are eliminated. Accordingly, the present invention improves storage utilization by standardizing the way storage is requested.

In accordance with aspects of the invention, in embodiments, the intelligent storage service request (ISSR) puts logic and standards in the hands of the few (e.g., an architectural review board (ARB)), instead of the many (application and/or database application owners). The present invention provides flexibility to the ARB to adjust standards that can then be implemented by any provisioning body (e.g., an in-house provisioning body and/or an alternate supplier). This flexibility allows standards to be set by the ARB by data type, for example, viewed with trending, to determine socialization/adoption, and with an underlying system that will allow rapid standards change with minimal impact to operations.

Implementing the present invention solves the dilemma of (information technology) IT not being able to control IT with regard to storage. In embodiments, the intelligent storage service catalog (ISSC) enables evergreen (e.g., enduring) standardization plus flexibility to alter standards with no effect to operations. Additionally, the present invention provides reporting transparency, for example, to effect cultural change within, e.g., a company.

Business Requirements Determination

In accordance with aspects of the invention, an organization's business requirements, including, for example, an optimal storage size for each data type are analyzed and determined. In embodiments, a determination of an organization's business requirements (and the storage technologies that meet or exceed those requirements) may be performed by the organization's Architectural Review Board (ARB). An ARB may include, for example, senior representation from the organization's teams that manage, rely on, and/or dictate/influence policies concerning data storage including compliance, records retention, systems architecture/engineering teams, systems operations, and/or security, amongst other representation. In embodiments, the ARB may be responsible for the determination of an organization's business requirements (and the storage technologies that meet or exceed those requirements), as the ARB may be best positioned (e.g., aware of and understanding business requirements) to make such determinations. This process may be automated, at least partially, by the use of rules. In contrast, application owners and/or database administrator (DBA) owners, for example, may not be aware of and/or understanding business requirements (e.g., by data type). A database administrator (DBA) is a person responsible for the design, implementation, maintenance and/or repair of an organization's database. The DBA may also be known by the titles Database Coordinator or Database Programmer, and is closely related to the Database Analyst, Database Modeler, Programmer Analyst, and Systems Manager. The DBA role includes, for example, the development and design of database strategies, monitoring and improving database performance and capacity, and planning for future expansion requirements.

FIG. 1 illustrates an exemplary and non-exhaustive data type list 100 in accordance with aspects of the invention. As such, the present invention contemplates other data types. The data type list 100 includes a sample of data types 110, wherein the evaluation of the business requirements for one or more of the data types 110 is performed in accordance with the present invention. Such data types may include, for example, operating system, application/binary files, application logs/dynamic files, static files, development code, online transaction processing (OLTP) database, data warehouse, database logs, email, email logs, backup, archive, file server, video, voice and compliance, amongst other data types. In accordance with aspects of the invention, the storage service catalog business requirements 105 are determined for one or more of the data types, e.g., depending on the business requirements of a particular organization.

FIG. 2 illustrates an exemplary and non-exhaustive business requirements definition (BRD) tool 200 for defining business requirements by data type in accordance with aspects of the invention. The BRD comprises a comprehensive listing of business requirements per data type that is referenced as part of the data storage request process. The exemplary BRD 200 is utilized to define, e.g., an organization's data storage business requirements by data type. As noted above, the determination of an organization's data storage business requirements may be performed by, for example, an architecture review board of the organization and/or IT leads for storage within the organization. Accordingly, an architecture review board of the organization and/or IT leads for storage within the organization may complete the one or more of the exemplary BRDs 200 in order to define the business requirements for the organization.

As shown in FIG. 2, the BRD 200 includes a data type indication section 205 for indicating one of the data types 110 (e.g., operating system, application/binary files, application logs/dynamic files, static files, development code, OLTP database, data warehouse, database logs, email, email logs, backup, archive, file server, video, voice and compliance). Additionally, as shown in FIG. 2, the BRD 200 includes a business requirements definition section 210. The business requirements definition section 210 is segmented into different types of business requirements 215, which include, for example, availability, size, performance, operational recovery, disaster recovery, data security, compliance and information lifecycle management (ILM).

Moreover, the business requirements definition section 210 includes for each business requirement 215, a requirements selection section 220 specific to that business requirement 215. For example, the "availability" business requirement sets forth the requirements for availability of data in storage (e.g., 99.999% of the time, 99.9% of the time, 99% of the time, etc.), amongst other requirements for availability. As shown in FIG. 2, the "availability" business requirement corresponds to a requirements selection section 220 comprising fields for selecting one of the "availability" requirements (e.g., "99.999%," "99.9%," "99%" etc.). That is, a user, e.g., an organization's IT lead for storage, may select one of the availability requirements for the data type 110 identified in the data type section 205.

The "size" business requirement sets forth requirements for a size of data storage (e.g., in gigabytes). Additionally, the "size" business requirement may set forth the data storage growth rates (e.g., in the past year and/or current year), amongst other requirements for size. The "performance" business requirement sets forth the requirements for data storage performance, including, for example, inputs/outputs per second (IOPS) and response time, amongst other requirements for data storage performance. The "operational recovery" business requirement sets forth the requirements for operational recovery. Such requirements for operational recovery may include, for example, recovery time objective, recovery point objective, retention period and/or a number of versions retained, amongst other requirements for operational recovery. The "disaster recovery" business requirement sets forth the requirements for disaster recovery. Such requirements for disaster recovery may include, for example, recovery time objective, recovery point objective, retention period and/or a number of versions retained, amongst other requirements for disaster recovery. The "data security" business requirement sets forth the requirements for data security. Such requirements for data security may include, for example, encryption (e.g., when data at rest and/or when data is moving) and/or data disposition (e.g., data shredding), amongst other requirements for data security (e.g., information rights management). The "compliance" business requirement sets forth the requirements for data storage compliance. Such requirements for data storage compliance may include, for example, data integrity and/or retention period, amongst other requirements for compliance. The "ILM" business requirement sets forth the requirements for information life cycle management. Such requirements for information life cycle management may include, for example, an active data usage cycle (e.g., monthly, quarterly, semi-annually, annually), amongst other requirements for life cycle management. In embodiments, one or more of the business requirements may also include a selection option of "other," which may then prompt for additional information, and/or "none." As should be understood, the exemplary BRD 200 is an example, and the invention contemplates other formats and structures for determining (or receiving determinations of) an organization's data business requirements.

In accordance with aspects of the invention, for each applicable data type 110, an organization would determine and/or select one or more applicable business requirements. Thus, for example, if an organization utilizes ten different data types, the organization would utilize ten different BRDs 200 determine and/or select the business requirements for each of the ten different data types.

The determination of an organization's data business requirements (including a determination of data types) may involve an iterative process, for example, through a series of interviews with, e.g., a data storage service provider. Moreover, such a determination of an organization's data business requirements may involve a manual process involving, for example, an organization's IT leads for data storage, an architectural review board and/or a data storage service provider, amongst other participants.

Figure 3:
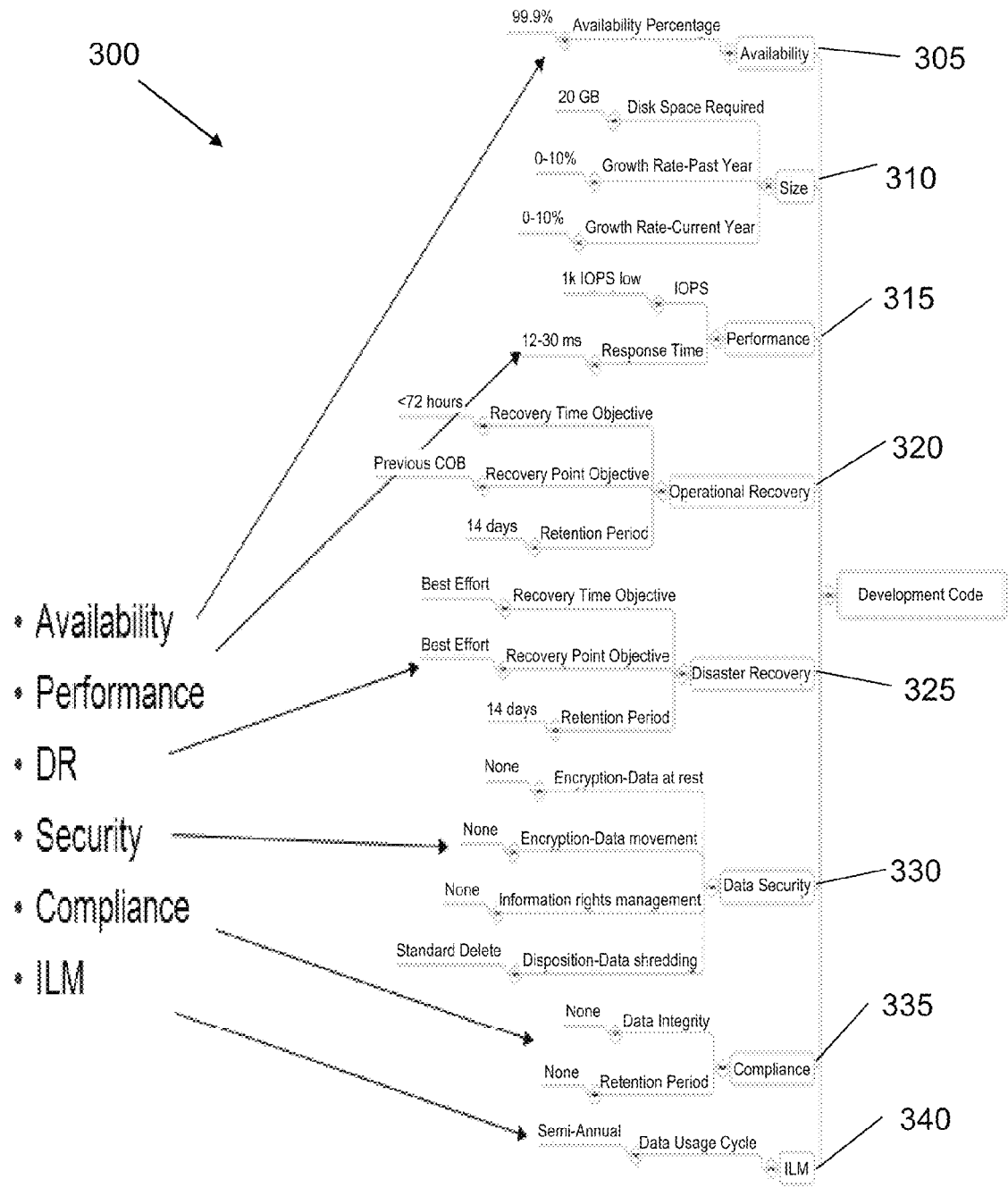
FIG. 3 illustrates an exemplary business requirements determination result of a business requirements definition process in accordance with aspects of the invention.

FIG. 3 illustrates an exemplary business requirements determination result 300 of a business requirements definition process for the "development code" data type. That is, the business requirements determination result 300 indicates selections (e.g., made via the exemplary BRD 200) regarding business requirements for a particular data type (e.g., development code).

As shown in FIG. 3, with this example, the business requirements determination result 300 sets forth "development code" data type business requirements. The business requirements determination result 300 includes data business requirements for availability 305, size 310, performance 315, operational recovery 320, disaster recovery 325, data security 330, compliance 335 and information lifecycle management (ILM) 340. Moreover, as can be observed in FIG. 3, some business requirements may be defined as "None." For example, the "data security" business requirement indicates "None" for each of "encryption—data at rest," "encryption—data movement," and "information rights management."

Storage Service Request

In accordance with aspects of the invention, once an organization's business requirements are defined, logic (e.g., programming code) containing these business requirements is integrated into an intelligent storage service request (ISSR) process. The ISSR process is used to place a request for data storage.

FIG. 4 shows an exemplary ISSR 400 in accordance with aspects of the invention. As shown in FIG. 4, the exemplary ISSR 400 is a request for storage for the "OLTP database" data type, e.g., for a new host. The user or requestor (e.g., application owner, typically) has selected, e.g., via drop-down menu, a particular data type 405 (e.g., "OLTP database"). The present invention guides the user or requestor with questions 410 (e.g., a small number of questions) to a standardized storage request. For example, such questions may include: "Is data storage request for growth or new space?," "What is criticality for data?" and/or "What form of information right management is required for the storage request?" Answers to such questions may be entered, for example, via a drop-down menu and/or an input field, amongst other entry methods. In embodiments, such questions may vary depending upon the selected data type, amongst other factors. Additionally, ISSR views may change according to role and may include (but are not limited to), for example, Any User, System Administrator, Storage Architect, Finance, Storage Engineer, Infrastructure Engineer and Backup Engineer. The exemplary ISSR 400 also includes an additional information section 415, which may display additional pertinent information (e.g., "other data types that may also require more space are: . . . " based upon, for example, inputs of the storage request (e.g., selected data type).

Moreover, in accordance with aspects of the invention, the user or requestor (e.g., the application owner) is not presented with questions about technology, services, data retention, etc. during submission of a data storage request. That is, by first performing the business requirements determination to understand an organization's data business requirements by data type, wherein questions about the organization's business requirements pertaining to technology, services, data retention, etc. are addressed by those more informed to make such determinations (e.g., IT storage leads and/or an architecture review board), an application owner, who may not possess or be capable of determining answers to those questions about the organization's business requirements, may request storage for the application by data type(s). Thus, by standardizing the way storage is requested, the data storage may become, in effect, a "black box" to the requestor.

Based upon the data collected in the ISSR 400, the storage request for "Development Code" would be provided with an appropriate data storage (e.g., a particular storage tier). Tiered storage is a data storage environment consisting of two or more kinds of storage delineated by differences in at least one of these four attributes, which include: price, performance, capacity and/or function. For example, the request shown in FIG. 4 may receive a "Tier 2" service as an initial placement tier (as indicated at 420). The least stringent data storage level is a "Tier 4," which may include nearline technologies and services; in contrast, the most stringent data storage level is a "Tier 1," which may include mission critical computer systems with, e.g., fully redundant subsystems and flash or short-stroked hard disks drive to meet extreme performance needs. The present invention contemplates that a customer's business requirements may necessitate more than the standard four tier (e.g., platinum, silver, gold, bronze) catalog of service and ISSC can accommodate this, if needed. Moreover, as the properties of tiered storage are understood by the customer and the supplier, both the customer and the supplier would have a clear understanding of the customer's business requirements.

Figure 5:
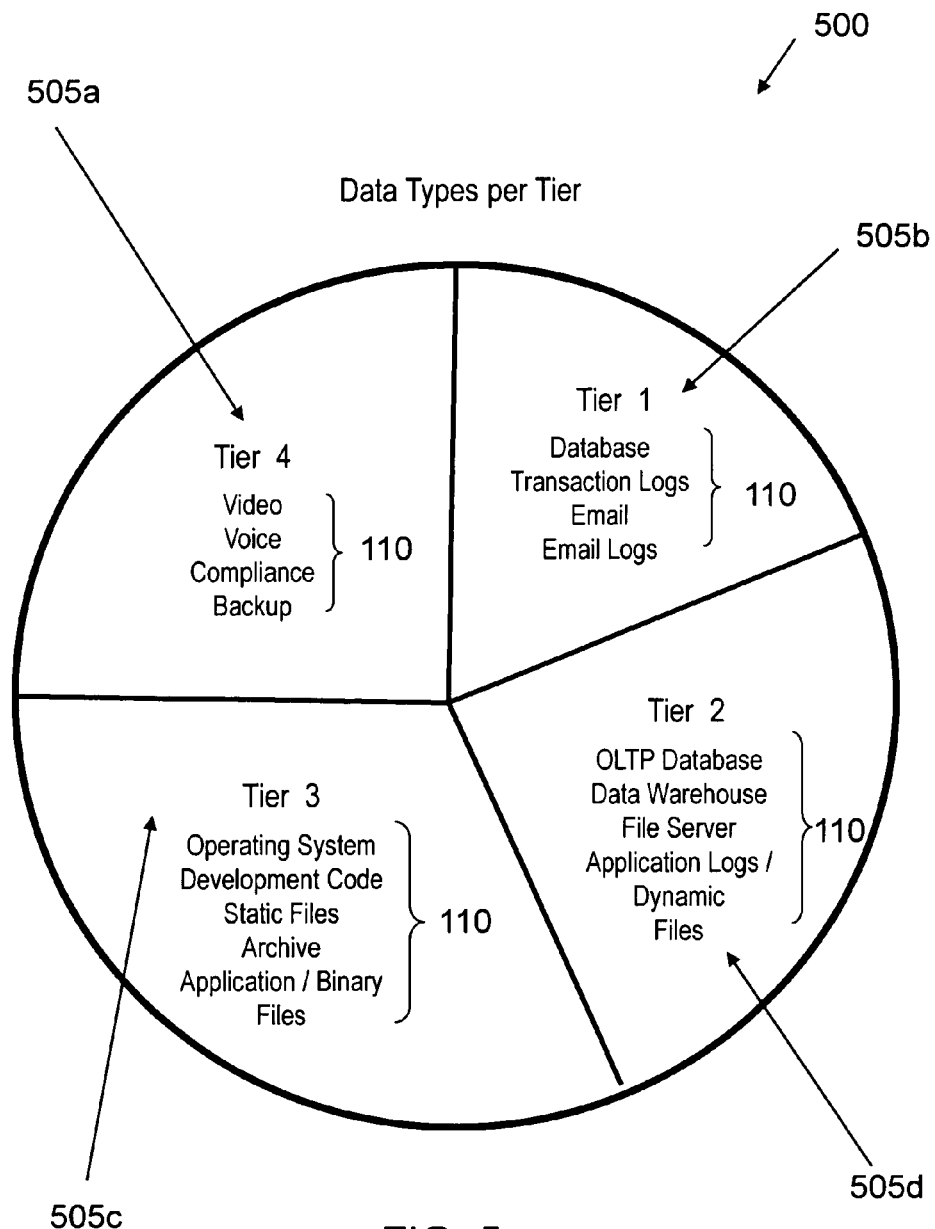
FIG. 5 illustrates an exemplary data types per tier graph in accordance with aspects of the invention.

FIG. 5 illustrates an exemplary data types per tier graph 500 in accordance with aspects of the invention. As shown in FIG. 5, multiple data types 110 may be classified into a smaller number of service and storage tiers 505a-505d (e.g., tiers 1 through 4). In embodiments, these classifications may be derived from, for example, historical data and/or empirical data, amongst other sources. For example, the data types "video," "voice," "compliance" and "backup" may be classified in Tier 4. Additionally, for example, the data types "database," "transaction logs," "email" and/or "email logs" may be classified in Tier 1. In embodiments, the present invention may utilize the exemplary data types per tier graph 500 to determine a data storage tier (e.g., Tier 2) based upon the identified data type, (e.g., file server).

FIG. 6 illustrates exemplary storage services information 605 and storage technologies information 610 for a particular storage request submitted by a requestor, e.g., an application owner. In embodiments, storage services information 605 and/or storage technologies information 610 may be presented to a user, for example, a storage requestor (e.g., an application owner and/or a DBA owner) and/or an IT lead for data storage or supporting service delivery organization (SDO). In accordance with aspects of the present invention, by utilizing the present invention, a requestor need not be aware of the storage technologies information 610. As such, only the storage services information 605 may be presented to the requestor, which sets forth the services for the storage. Such services data may include, for example, remote storage replication, point in time disk copy, monthly growth forecasts, storage network, amongst other storage services data.

In contrast to the storage service information 605, the storage technologies information 610 may be sent to an IT lead for data storage and/or the supporting SDO. As shown in FIG. 5, the storage technologies data may include, for example, performance level range, storage subsystem, drives/RAID configuration and/or application protection software, amongst other storage technologies data.

ISSR Integration with SERP and/or ESP

In embodiments, the ISSR process can integrate with other offerings that provide insight into the configuration of an environment, as, for example, up to date environmental data may be necessary for efficient and correct management. Additionally, in embodiments, the ISSR process is operable to integrate with process standardization software and/or workflow in an environment. For example, the ISSR process defines the actual workflow and data structure used in management of an environment. The data and the data's associated process may be integrated with a workflow system to provide an implementation layer for the ISSR process.

In accordance with aspects of the invention, the ISSC (and ISSR) provides data type clarity that is functional across all applications. The data type clarity enables application alignment to business requirements, allowing for ease of measurement and trending through Storage Enterprise Resource Planner (SERP) and operational standardization through, for example, an enterprise standardization program (ESP). An ESP is operable to provision storage in a same way regardless of a storage manufacturer. Additional downstream benefits of data type based storage allocation and growth include ease of replication automation and information lifecycle management (ILM) policy implementation.

In embodiments, the Intelligent Storage Service Request (ISSR) process and/or procedures can be standardized through enterprise standardization program (ESP) process excellence and fit within a Request for Service (RFS) process as well. In embodiments, the ISSR can be sent for technical approval (e.g., to an ISSR storage architect) and/or for financial approval (e.g., to ISSR finance). Once approved, the ISSR may be sent to technical teams for execution (e.g., to an ISSR technical teams). In embodiments, the present invention addresses both storage and backup storage. Also, Storage Enterprise Resource Planner (SERP) can be leveraged to verify information in the ISSR and to display, for example, architecture review board (ARB) approved watermarks.

SERP collects data from many instances of storage resource management (SRM) and asset tools, and provides a view of assets with respect to geography and business infrastructure. SERP is operable to provide, for example, capacity planning, configuration management, reclamation and utilization improvement, ILM and right-tiering, deployment planning and reservation, topology and connectivity, financial transparency and/or chargeback.

Storage resource management (SRM) is the process of optimizing the efficiency and speed with which the available drive space is utilized in a storage area network (SAN) and network attached storage (NAS) environment. Functions of an SRM program include data storage, data collection, data backup, data recovery, SAN performance analysis, storage virtualization, storage provisioning, forecasting of future needs, maintenance of activity logs, user authentication, protection from hackers and worms, and management of network expansion. An SRM solution may be offered as a stand-alone product, or as part of an integrated program suite.

Additionally, the present invention is operable to trend progress against the data types for an organization's storage utilization. As data type transparency is trended, the present invention is operable to identify applications that are not in alignment with the organization requirements and correct such organization requirements, e.g., over time, from, for example, a tier and/or an information lifecycle management (ILM) perspective.

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

- an electrical connection having one or more wires,
- a portable computer diskette,
- a hard disk,
- a random access memory (RAM),
- a read-only memory (ROM),
- an erasable programmable read-only memory (EPROM or Flash memory),
- an optical fiber,
- a portable compact disc read-only memory (CDROM),
- an optical storage device,
- a transmission media such as those supporting the Internet or an intranet, or
- a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

Figure 7:
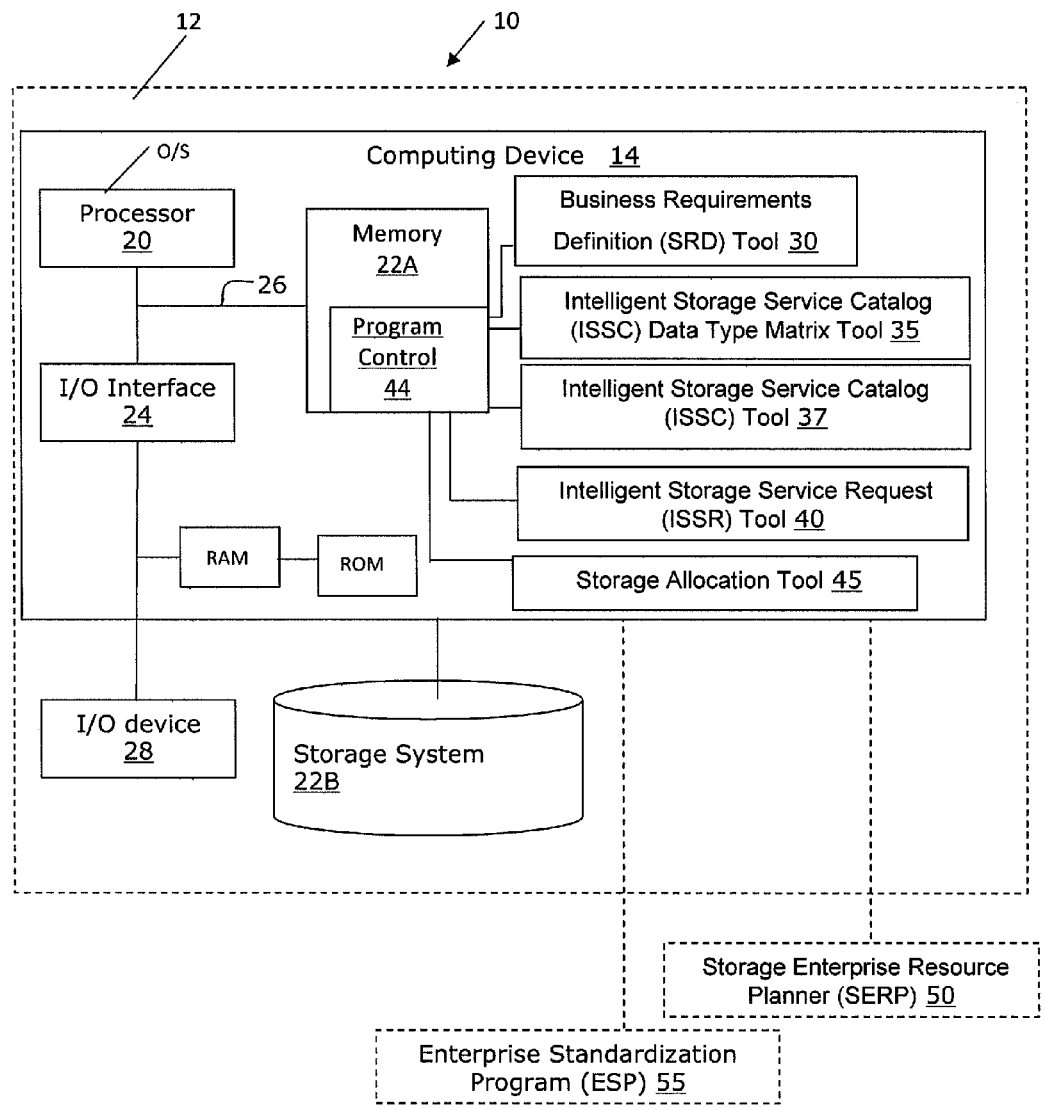
FIG. 7 shows an illustrative environment for implementing the steps in accordance with aspects of the invention.

FIG. 7 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 7).

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device/resource 28 and the storage system 22B. In embodiments, the storage system 22B may store, for example, an organization's determined business requirements definitions and/or data storage allocation rules. Additionally, the storage system 22B may store, for example, an ISSC data type matrix, a listing of all possible data types and/or data types per storage tier associations, amongst other information. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handheld device, PDA, handset, keyboard etc. Additionally, in embodiments, the computing device 14 may be in communication with a Storage Enterprise Resource Planner (SERP) 50 and/or one or more Enterprise Standardization Programs (ESP) 55 (as indicated by the dashed lines).

In general, the processor 20 executes computer program code (e.g., program control 44), which can be stored in the memory 22A and/or storage system 22B. While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

The computing device 14 also includes a business requirements definition (BRD) tool 30, an intelligent storage service catalog (ISSC) data type matrix tool 35, an intelligent storage service catalog (ISSC) tool 37 that details the underlying technologies and service tiers defined for the business, an intelligent storage service request (ISSR) tool 40 and a storage allocation tool 45. The business requirements definition (BRD) tool 30 is operable to receive an organization's data business requirements definitions, e.g., the processes described herein. In embodiments, the organization's data business requirements definitions are determined by data type and may involve an iterative process. A business requirements definition (BRD) tool, for example, as illustrated in FIG. 2, may be utilized for defining business requirements by data type in accordance with aspects of the invention. The intelligent storage service catalog (ISSC) data type matrix tool 35 is operable to process the data business requirements definitions and define data storage rules (e.g., for a particular organization) based on data type, e.g., the processes described herein. FIG. 3 shows an exemplary illustration of such defined business rules for one type of data (i.e., "development code"). The data business rules may be stored in a database, e.g., storage system 22B. The ISSC tool 37 is operable to define request rules for the business based on the ISSC data type matrix.

The intelligent storage service request (ISSR) tool 40 is operable to receive a request for storage based on data type, e.g., the processes described herein. In embodiments, the ISSR tool 40 may receive a storage service request, for example, as illustrated in FIG. 4. The storage allocation tool 45 is operable to determine a storage allocation based on the storage service request, e.g., the processes described herein. In embodiments, the storage allocation tool 45 may determine a storage allocation based on data type. Additionally, in embodiments, the storage allocation tool 45 may utilize data type per tier classifications, for example, as shown in FIG. 5. The storage allocation tool 45 may also provide storage services information and/or storage technologies information, for example, as illustrated in FIG. 6 based on the allocated storage. The business requirements definition (BRD) tool 30, the intelligent storage service catalog (ISSC) data type matrix 35, the intelligent storage service catalog (ISSC) that details the underlying technologies and service tiers defined for the business, the intelligent storage service request (ISSR) tool 40 and the storage allocation tool 45 can be implemented as one or more program code in the program control 44 stored in memory 22A as separate or combined modules. The business requirements definition (BRD) tool 30, the intelligent storage service catalog (ISSC) data type matrix tool 35, the intelligent storage service catalog (ISSC) tool 37 that details the underlying technologies and service tiers defined for the business, the intelligent storage service request (ISSR) tool 40 and the storage allocation tool 45 may also be provided on separate, dedicated processors, or in any combination of processors implemented in the computing infrastructure of FIG. 7.

Flow Diagrams

Figure 8:
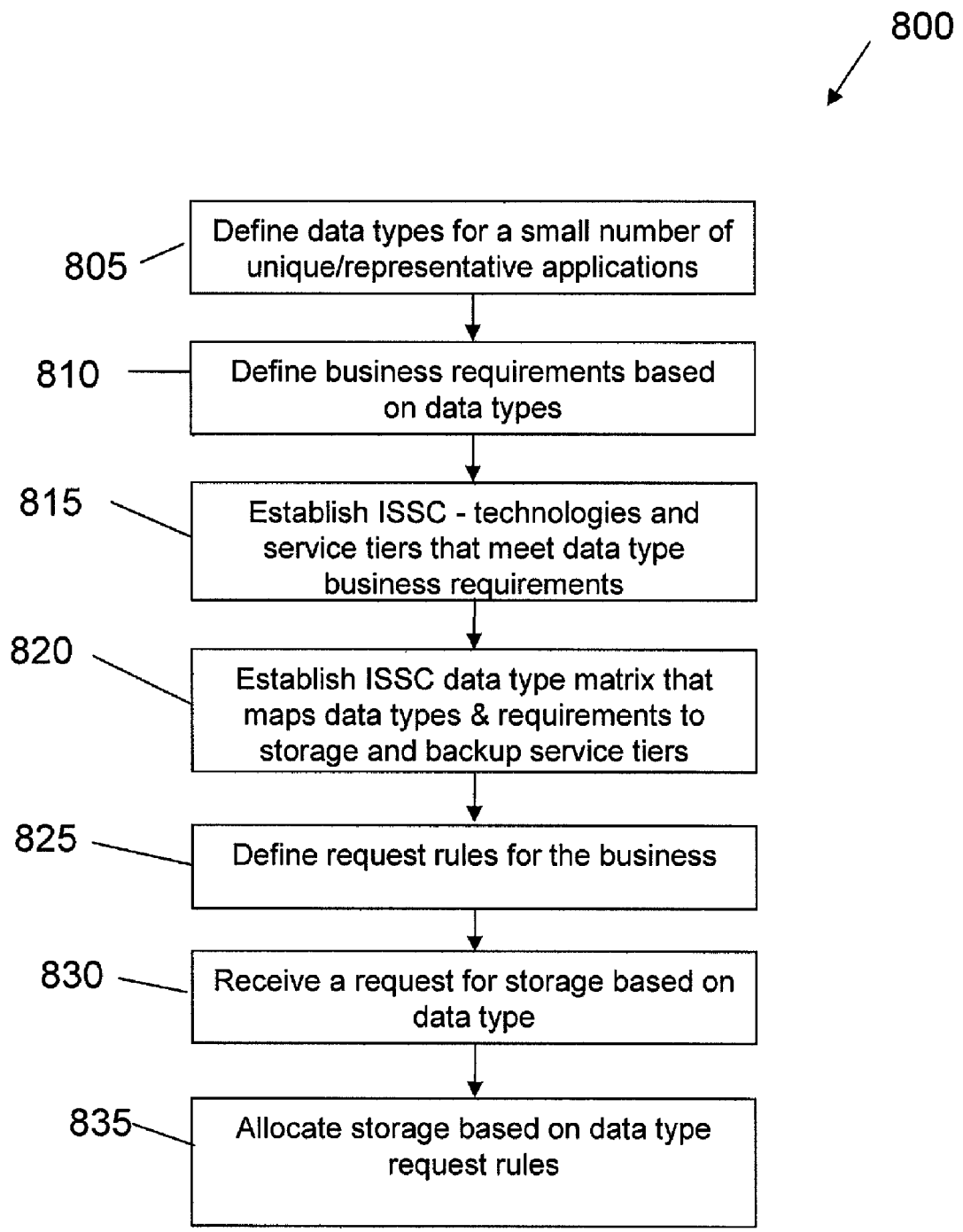
FIGS. 8 and 9 show exemplary flow diagrams in accordance with aspects of the invention.
Figure 9:
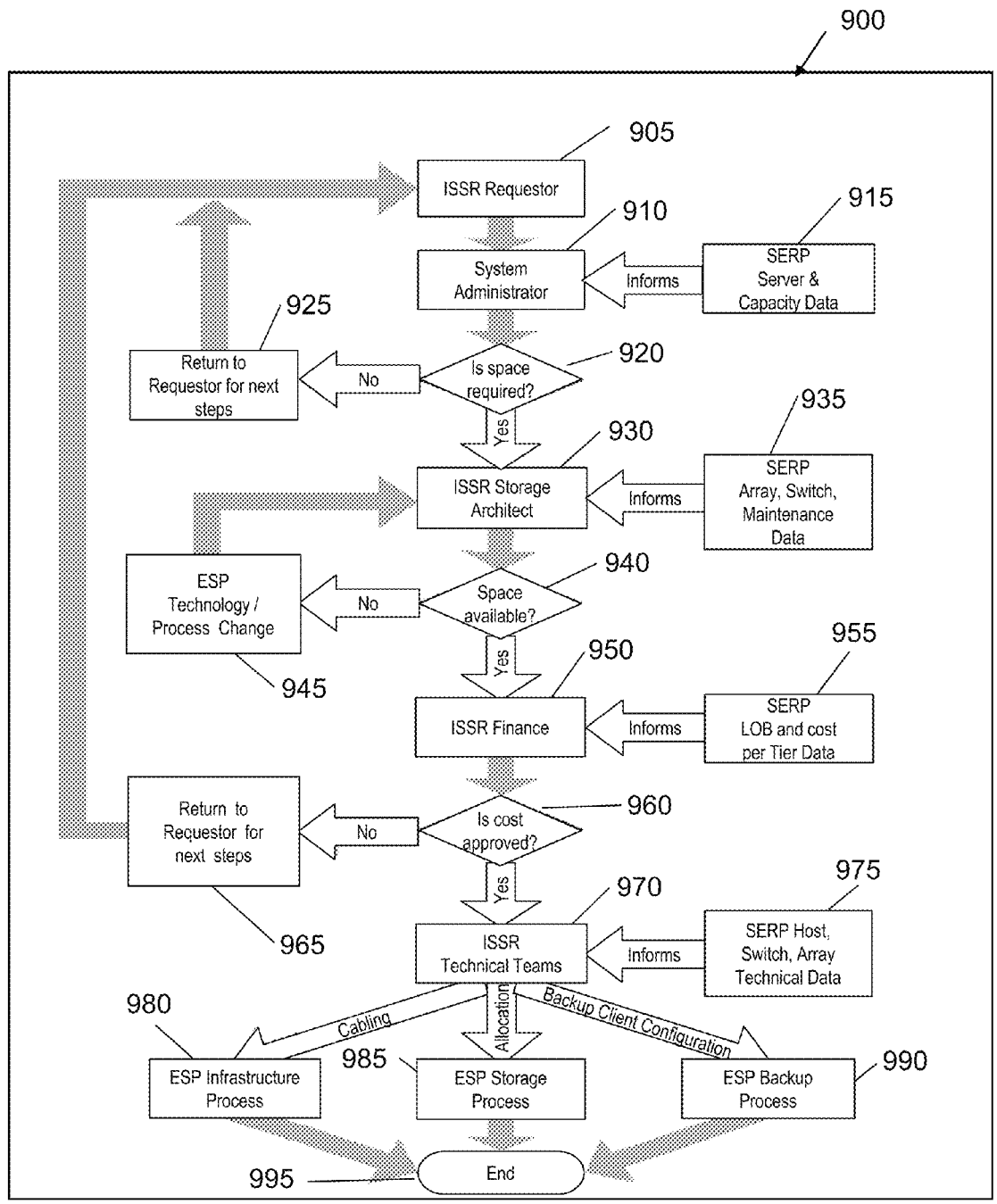

FIGS. 8 and 9 show exemplary flow diagrams for performing aspects of the present invention. The steps of FIGS. 8 and 9 may be implemented in the environment of FIG. 7, for example. The flow diagrams may equally represent a high-level block diagrams or a swim-lane diagrams of the invention. The flowchart and/or block diagram in FIGS. 8 and 9 illustrate the architecture, functionality, and operation of possible implementations of systems, methods and computer program products according to various embodiments of the present invention. In this regard, each block in the flowcharts, block diagrams or swim-lane diagrams may represent a module, segment, or portion of code, which comprises one or more executable instructions for implementing the specified logical function(s). It should also be noted that, in some alternative implementations, the functions noted in the blocks may occur out of the order noted in the figure. For example, two blocks shown in succession may, in fact, be executed substantially concurrently, or the blocks may sometimes be executed in the reverse order, depending upon the functionality involved. Each block of each flowchart, and combinations of the flowchart illustration can be implemented by special purpose hardware-based systems that perform the specified functions or acts, or combinations of special purpose hardware and computer instructions and/or software, as described above. Moreover, the steps of the flow diagram may be implemented and executed from either a server, in a client server relationship, or they may run on a user workstation with operative information conveyed to the user workstation. In an embodiment, the software elements include firmware, resident software, microcode, etc.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

Furthermore, the invention can take the form of a computer program product accessible from a computer-usable or computer-readable medium providing program code for use by or in connection with a computer or any instruction execution system. The software and/or computer program product can be implemented in the environment of FIG. 7. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 8 depicts an exemplary flow 800 for a process in accordance with aspects of the present invention. At step 805, storage requirements are determined based on data type. In embodiments, the storage requirements may be determined by an organization's architectural review board (ARB), an organization's IT leads for storage, a storage service provider and/or an automated system based on rules. The storage requirements may be received by the storage requirements definition (SRD) tool and stored on storage (e.g., storage system 22B of FIG. 7).

FIG. 8 depicts an exemplary flow 800 for a process in accordance with aspects of the present invention. At step 805, data types for a number of unique and/or representative applications are defined. At step 810, business requirements are determined based on data type. In embodiments, steps 805 and 810 may be performed by an organization's architectural review board (ARB), an organization's IT leads for storage, a storage service provider and/or an automated system based on rules. The business requirements may be received by the business requirements definition (BRD) tool and stored on storage (e.g., storage system 22B of FIG. 7).

At step 815, the intelligent storage service catalog is established by determining the technologies and services tiers that meet data type business requirements using the ISSC matrix tool. At step 820, the ISSC data type matrix tool establishes the intelligent storage service catalog (ISSC) data type matrix that maps data types and requirements to storage and backup service tiers. At step 825, the ISSC tool establishes data storage acquisition or request rules based on the determined business requirements for each applicable data type and the underlying technologies and services that at least meet the business requirements of that data type in the intelligent storage service catalog (ISSC). At step 830, the intelligent storage service request (ISSR) tool receives a request for storage based on data type, e.g., from an application owner. At step 835, the storage allocation tool allocates (or directs allocation of) storage based on the received request for storage and the data storage acquisition rules.

FIG. 9 illustrates an exemplary flow diagram 900, which integrates the ISSR process with SERP and ESP, and depicts how storage reporting software, such as, for example, Storage Enterprise Resource Planner (SERP), "informs" the ISSR by providing appropriate data at specific times in the ISSR process. Also, the ISSR points the viewer to the best practice process and/or procedures, for example, an Enterprise Standardization Program (ESP), for execution.

At step 905, an ISSR requestor submits a storage request. At step 910, a system administrator (or rules-based tool, e.g., ISSR tool) receives the storage request. At step 915, the SERP informs the system administrator (or rules-based tool, e.g., ISSR tool) of server and capacity data. At step 920, the system administrator (or rules-based tool, e.g., ISSR tool) determines whether space is required to satisfy the storage request. If, at step 920, the system administrator (or rules-based tool, e.g., ISSR tool) determines that space is not required to satisfy the storage request, at step 925, the process returns to the requestor for next steps and the process proceeds to step 905. If, at step 920, the system administrator (or rules based tool, e.g., ISSR tool) determines that space is required to satisfy the storage request, at step 930, the ISSR storage architect (e.g., a service provider or rules-based tool, e.g., ISSR tool) receives the storage request. At step 935, the SERP provides array, switch and maintenance data to the storage architect (or rules-based tool, e.g., ISSR tool).

At step 940, the ISSR storage architect (or rules-based tool, e.g., ISSR tool) determines whether space is available to satisfy the storage request. If, at step 940, the storage architect (or rules-based tool, e.g., ISSR tool) determines that space is not available to satisfy the storage request, at step 945, the enterprise standardization program (ESP) determines a technology and/or process change in order to provide available space to satisfy the storage request. If, at step 940, the storage architect (or rules-based tool, e.g., ISSR tool) determines that space is available to satisfy the storage request, at step 950, the storage request is forwarded to ISSR finance. At step 955, the ISSR finance (or rules-based tool, e.g., ISSR tool) receives line of business (LOB) and cost per data tier information from the SERP.

At step 960, the ISSR finance (or rules-based tool, e.g., ISSR tool) determines whether cost for the storage request is approved. If, at step 960, the ISSR finance (or rules-based tool, e.g., ISSR tool) determines that cost is not approved, at step 965, the process returns to the requestor for next steps and the process proceeds to step 905. If, at step 960, the ISSR finance (or rules-based tool, e.g., ISSR tool) determines that cost is approved, at step 970, the ISSR technical teams (or rules-based tool, e.g., storage allocation tool) receive the request for storage and provide information to additional processes, for example, steps 980, 985 and 990. At step 975, the SERP provides host, switch and/or array technical data to the ISSR technical teams (or rules-based tool, e.g., storage allocation tool) and ISSR technical teams (or rules-based tool, e.g., storage allocation tool) provide information to additional processes, for example, steps 980, 985 and 990. For example, at step 980, the ESP receives cabling information from the ISSR technical teams (or rules-based tool, e.g., storage allocation tool) and performs an infrastructure process to determine infrastructure for the storage request. At step 985, the ESP receives allocation information from the ISSR technical teams (or rules-based tool, e.g., storage allocation tool) and performs a storage process to allocate storage for the storage request. At step 990, the ESP receives backup client configuration information from the ISSR technical teams (or rules-based tool, e.g., storage allocation tool) and performs a backup process. At step 995, the process ends.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method implemented in a computer infrastructure having computer executable code tangibly embodied on a computer readable storage medium having programming instructions operable to:
   receive a definition of business requirements for each one of a plurality of data types;
   define an intelligent storage service catalog (ISSC) that details underlying technologies and service tiers defined for a business;
   establish a data storage allocation rule for each one of the plurality of data types based on the definition of business requirements for each one of a plurality of data types;
   receive a request for storage for at least one of the plurality of data types; and
   allocate data storage based on the request for storage and the data storage allocation rule for the one of the plurality of data types.

2. The method of claim 1, wherein the plurality of data types comprises at least one of: operating system, application/binary files, application logs/dynamic files, static files, development code, online transaction processing (OLTP) database, data warehouse, database logs, email, email logs, backup, archive, file server, video, voice, compliance, and another data type specific to the organization.

3. The method of claim 1, wherein the definition of business requirements comprises business requirements for at least one of: availability, size, performance, operational recovery, disaster recovery, data security, compliance and life cycle management.

4. The method of claim 1, further comprising defining the business requirements using a business requirements definition (BRD) tool and the intelligent storage service catalog (ISSC).

5. The method of claim 4, wherein using the business requirements definition (BRD) tool comprises defining data type selection and specifying the business requirements for the data type selection and leveraging an intelligent storage service catalog (ISSC) data type matrix to identify the underlying technologies and services in the intelligent storage service catalog (ISSC) that will meet those business requirements.

6. The method of claim 5, wherein the defining the data type selection and the specifying the business requirements for the data type selection is performed for each of the plurality of data types utilized by the organization.

7. The method of claim 1, wherein the at least one definition of business requirements is determined by at least one of:
   an architecture review board of the organization;
   an information technology (IT) lead for storage of the organization;
   a storage service provider; and
   a rules-based system.

8. The method of claim 1, wherein the establishing the data storage allocation rule comprises:
   reviewing the definition of business requirements for each one of the plurality of data types; and
   establishing a storage requirement rule for each one of the plurality of data types.

9. The method of claim 1, wherein:
   the receiving the definition of business requirements occurs at a first interface; and
   the request for storage comprises an intelligent storage service request (ISSR) received from a second interface that is different than the first interface.

10. The method of claim 9, wherein the ISSR is received from an application owner or a database administrator or any user.

11. The method of claim 9, wherein the ISSR indicates a selection of data type for the storage request.

12. The method of claim 1, wherein the allocation of the data storage comprises determining a storage tier based on the at least one data type of the request for storage.

13. The method of claim 1, wherein the allocation of the data storage additionally comprises at least one of:
   providing storage services information to a requestor; and
   providing storage technologies information to a supporting service delivery organization (SDO).

14. The method of claim 1, wherein a service provider at least one of creates, maintains, deploys and supports the computer infrastructure.

15. The method of claim 1, wherein the steps of claim 1 are provided by a service provider on a subscription, advertising, and/or fee basis.

16. The method of claim 1, further comprising:
classifying a first subset of the plurality of data types in a first storage tier; and
classifying a second subset of the plurality of data types in a second storage tier, wherein:
the first storage tier is different than the second storage tier;
the first subset is different than the second subset;
the first subset of the plurality of data types comprises more than one of the plurality of data types; and
the second subset of the plurality of data types comprises more than one of the plurality of data types.

17. A system implemented in hardware, comprising:
a business requirements definition (BRD) tool operable to receive at least one definition of business requirements for an organization for at least one data type;
an intelligent storage service catalog (ISSC) data type matrix tool operable to establish at least one data storage allocation rule based on the at least one definition of the business requirements;
an intelligent storage service catalog (ISSC) tool that details underlying technologies and services that at least meet the business requirements of the at least one data type;
an intelligent storage service request (ISSR) tool operable to receive a request for storage for the at least one data type; and
a storage allocation tool operable to allocate data storage based on the request for storage and the at least one data storage allocation rule.

18. The system of claim 17, wherein the at least one definition of the business requirements is determined by defining a data type selection and specifying the business requirements for the data type selection for each data type utilized by the organization.

19. The system of claim 17, wherein the ISSR tool is operable to receive an ISSR, which indicates a selection of data type for the storage request.

20. A computer program product comprising a computer usable storage medium having readable program code embodied in the storage medium, the computer program product includes at least one component operable to:
receive a respective definition of business requirements for an organization for each one of a plurality of data types;
establish a respective data storage allocation rule for each one of a plurality of data types based on the respective definition of business requirements for an organization for each one of a plurality of data types;
receive a request for storage for one of the plurality of data types; and
allocate data storage based on the request for storage and the respective data storage allocation rule for the one of the plurality of data types,
wherein the at least one data type comprises at least one of: operating system, application/binary files, application logs/dynamic files, static files, development code, online transaction processing (OLTP) database, data warehouse, database logs, email, email logs, backup, archive, file server, video, voice and compliance, and
wherein the at least one definition of business requirements for the organization for the at least one data type comprises business requirements for at least one of: availability, size, performance, operational recovery, disaster recovery, data security, compliance and life cycle management.

21. A computer system for at least one of modeling and forecasting technology adoption, the system comprising:
a CPU, a computer readable memory and a computer readable storage media;
first program instructions to receive at least one definition of business requirements for an organization for at least one data type;
second program instructions to establish at least one data storage allocation rule based on the at least one data type and the at least one definition of business requirements;
third program instructions to receive a request for storage for the at least one data type; and
fourth program instructions to allocate data storage based on the request for storage and the at least one data storage allocation rule,
wherein the first, second, third and fourth program instructions are stored on the computer readable storage media for execution by the CPU via the computer readable memory.

22. A method comprising:
providing a computer infrastructure operable to:
receive a definition of storage requirements for each one of a plurality of data types;
establish a data storage allocation rule for each one of the plurality of data types based on the definition of storage requirements for each one of the plurality of data types;
receive a request for storage for at least one of the plurality of data types; and
allocate data storage based on the request for storage and the data storage allocation rule for the one of the plurality of data types.

23. The method of claim 22, wherein:
the receiving the definition of storage requirements and the establishing the data storage allocation rule for each one of the plurality of data types both occur prior to the receiving the request for storage; and
the receiving the definition of storage requirements occurs at a first interface and the receiving the request for storage occurs at a second interface that is different than the first interface.

* * * * *